United States Patent

[11] 3,542,386

| [72] | Inventor | Wolfgang Becker<br>Dusseldorf, Germany |
|---|---|---|
| [21] | Appl. No. | 741,973 |
| [22] | Filed | July 2, 1968 |
| [45] | Patented | Nov. 24, 1970 |
| [73] | Assignee | Paul Forkardt Kommanditgesellschaft<br>Dusseldorf, Germany |
| [32] | Priority | July 3, 1967 |
| [33] | | Germany |
| [31] | | No. F52844 |

[54] POWER-OPERATED JAW CHUCK
3 Claims, 6 Drawing Figs.

[52] U.S. Cl................................................. 279/121,
279/123
[51] Int. Cl......................................................... B23b 31/16
[50] Field of Search............................................ 279/112,
121, 123

[56] References Cited
UNITED STATES PATENTS
| 919,536 | 4/1909 | Carter | 279/112 |
| 3,199,880 | 8/1965 | Blattry | 279/121 |

Primary Examiner—Lester M. Swingle
Assistant Examiner—Donald D. Evenson
Attorney—Walter Becker ABSTRACT: A power-operated chuck for machine tools with driving jaws operable by a central piston and engaging wedge grooves of said piston, while individually and manually adjustable chuck carriers are connected to said driving jaws, said jaw carriers carrying jaws, said driving jaws and said jaw carriers being arranged in pairs in radial passage means with the jaw carriers located radially outwardly with regard to said driving jaws, and means steplessly adjustable and interconnecting the respective driving jaw and jaw carrier pertaining to one and the same pair.

INVENTOR.
Wolfgang Becker
BY

POWER-OPERATED JAW CHUCK

The invention relates to a power-operated jaw chuck for machine tools with clamping jaws centered by a piston.

In jaw chucks of this type, which are preferably designed as three-jaw chucks, the clamping jaws are divided into jaw carriers and jaws, in order, despite the small adjusting movements which result from the power operation, to achieve as large a chuck capacity of the jaw chuck as possible. Due to this division, despite the constant adjusting movement of the jaw carrier which engages in keyways of the piston, a clamping of work pieces of varying diameters can be achieved by the jaws being radially adjusted on the jaw carriers. In this case the jaws are mostly attached by means of a sliding block which engages in a T-shaped slot in the jaw carrier. In order to obtain a good power transmission, the jaw carriers and the jaws are provided either with cross-grooves or with teeth, which after the tightening of the fastening screws bring about a positive connection.

Since in mass production these positive connections, with a guarantee of interchangeability, have fitting tolerances and do not make possible any continuous adjustment of the jaws to the jaw carriers, it is necessary that during the assembly of the chuck the jaws must be bored on their gripping surfaces in order to obtain a true running of the chuck. With weak jaws of high true running accuracy, this boring process must always be repeated whenever jaws are exchanged or when an interchange of the individual jaws has taken place during an adjustment of the jaws.

In order to avoid these disadvantages, it has been known for some time to adjustably attach the jaw carriers which serve for the attachment of the jaws, to a so-called driving jaw which has its base in engagement with the keyway of the piston. Since the adjustment of the jaw carrier on the driving jaw can be effected in an infinite way, for example by means of a threaded spindle, the possibility exists of adjusting the individual jaws of the chuck to an optimal true running by operating the threaded spindle, without the jaws having to be centrally bored under pressure. With this known construction of the chuck, the driving jaw and the jaw carrier which is steplessly adjustable with respect to the driving jaw has its own radial guide in the chuck body, so that not only is the production cost increased but also the axial length of the jaw chuck is increased. The increase in the axial length of the jaw chuck is particularly undesirable with regard to the mounting of the spindle which carries the jaw chuck.

It is, therefore, an object of the invention to provide a power-operated jaw chuck for machine tools with driving jaws centered by a piston, which will work without additional guides for the jaw carriers which are adjustable in an infinite way on the driving jaws and which does not require any enlargement of the axial length with regard to the normal chuck.

With this object in view, according to the invention it is proposed to arrange the driving jaws and the jaw carriers so that they lie radially behind one another in the respective radial guides of the chuck body and are steplessly adjustable with respect to each other.

According to a further feature of the invention, the driving jaw is connected to the jaw carrier by an adjusting spindle which can be rotated from the outside, and which for engaging with the driving jaw or with the jaw carrier is provided with different thread pitches. Thus, despite coarse threads, a fine adjustment is achieved, which corresponds to the difference in pitch of the two threads. In order to facilitate the insertion of the adjusting spindle, the core diameter of the thread in the jaw carrier is greater than the outer diameter of the thread in the driving jaw.

In order to obtain an adequate guide for the jaw carrier even in small jaw chucks, it is proposed, according to the invention, to provide the driving jaw with a radially outwardly projecting guide pin which is fitted so that it can move longitudinally in a corresponding bore of the jaw carrier.

With the proposal according to the invention a jaw chuck is created, the jaws of which can be quickly and simply adjusted to optimal true running under pressure, without having to consider the position of the serrations or the toothing between the jaw and the jaw carrier. In this way, sources of error such as production tolerances of all transmission components, e.g. the keyways in the chuck piston, the key of the jaw carrier, in the position of the toothing of the center of the chuck or an error in the true running of the machine spindle and defective installation of the chuck, can be avoided. Due to the arrangement of the driving jaws and the jaw carriers, which lie radially one behind another, in the respective radial guide, each ordinary production chuck can be subsequently equipped with the additional adjustment according to the invention, the arrangement being suitable for internal and external clamping. Moreover, the arrangement according to the invention makes possible a rapid exchange of jaw carriers without dismounting the chuck, when, for example, jaw sets consisting of jaw carriers and jaws are to be exchanged. After unscrewing the adjusting spindle, the jaw carriers together with the jaws can be removed in a simple way from the radial guide of the chuck body. Due to the design according to the invention, an exchange of different sets of shaped jaws of a chuck among each other as well as from one chuck to another is possible, which is particularly important for mass production and for the delivery of spare parts. Also, eccentrics can be turned with the greatest accuracy. Finally, the proposal is particularly suitable for a four-jaw-chuck, since, due to the construction according to the invention, the correct installation of all four jaws can be adjusted.

The invention is illustrated by way of example in the accompanying drawings, in which: FIG. 1 shows a longitudinal section through a first embodiment of a chuck according to the invention;

Figure 1:
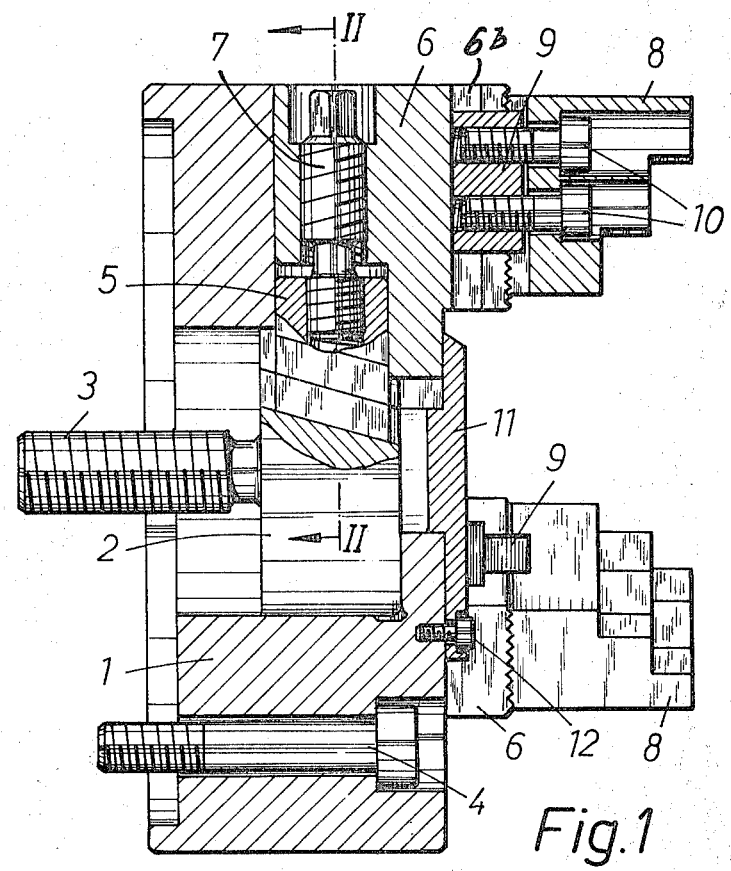

In both embodiments there is arranged in the chuck body 1 a piston 2 which is connected to a tie-rod (not shown) by means of a tension screw 3. This tie-rod leads through the hollow spindle to which the chuck body is connected by means of screws 4 to a clamping device, e.g. a pneumatically or hydraulically operable cylinder.

The piston 2 is provided in a known way with keyways 2a (FIG. 2) engaged by the hammerhead-shaped keys 2b of the jaws. Each jaw of the illustrated three-jaw-chuck consists of three parts: a driving jaw 5 which is guided in the keyway 2a of the piston 2, a jaw carrier 6 which is infinitely adjustable on the driving jaw 5, and a jaw 8 attached to the jaw carrier 6.

In the illustrated embodiments, the jaws 8 and jaw carriers 6 are provided with a toothing in order to obtain a positive engagement between these two parts. The attachment of the jaw 8 is effected by means of a sliding block 9 which engages in a T-slot 6b of the jaw carrier 6 and to which the jaw 8 is attached by means of the jaw fixing screws 10. The bore which receives the piston 2 in the chuck body 1 is closed off at the front by a protective cover 11 which is attached to the chuck body 1 by means of cover screws 12.

The driving jaws 5 and jaw carriers 6 while lying radially behind each other are guided in the respective radial guide 1a of the chuck body 1. The adjustment of the jaw carrier 6 in relation to the driving jaw 5 may be effected by means of an adjusting spindle 7, which is accessible from the outside. This adjusting spindle 7 has two different thread pitches, one of which engages in the jaw carrier 6 and the other engages in the driving jaw 5.

The adjustment of the jaws is effected by means of an axial movement of the piston 2 and may be obtained by a hydraulic or pneumatic clamping device. Due to this axial movement of the piston 2, there will at the same time occur a radial movement of the driving jaws 5 which engage in the keyways 2a. This movement is transmitted to the jaws 8 by means of the jaw carriers 6 attached to the driving jaws 5.

After the workpiece has been chucked, by turning the adjusting spindle 7, the thread parts of which have different pitches, there occurs a relative motion between the jaw carrier 6 and the driving jaw 5, which corresponds to the difference in pitch between the two threads of the adjusting spindle 7. In this way, it is possible to obtain a fine adjustment despite comparatively coarse threads. This fine adjustment makes it possible to adjust the jaws, independently of each other, to an exact true running. Since an adjustment of the jaw carrier takes place under pressure, which indicates the negative true running or concentricity error, the other jaws are automatically adjusted due to the clamping device connected to the chuck piston. In addition thereto, the jaws 8 can be adjusted in relation to the jaw carrier 6 after the release of the sliding block 9, in order to utilize the diameter corresponding to the size of the chuck despite the relatively small movement of the jaws during the clamping process.

Figure 3:
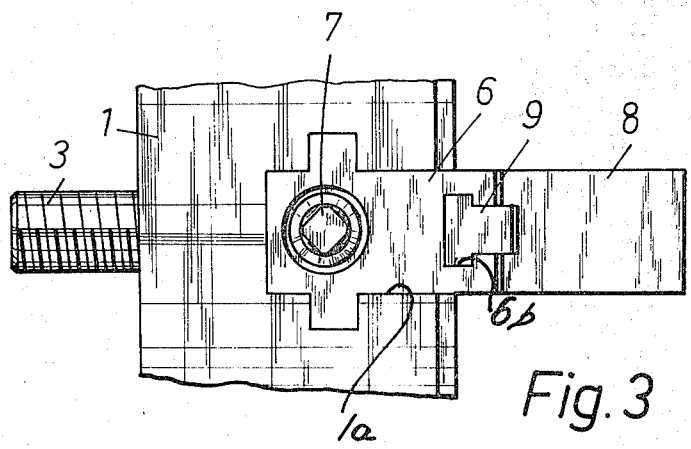
FIG. 3 shows a plan view of a part of the chuck according to FIG. 1.
Figure 2:
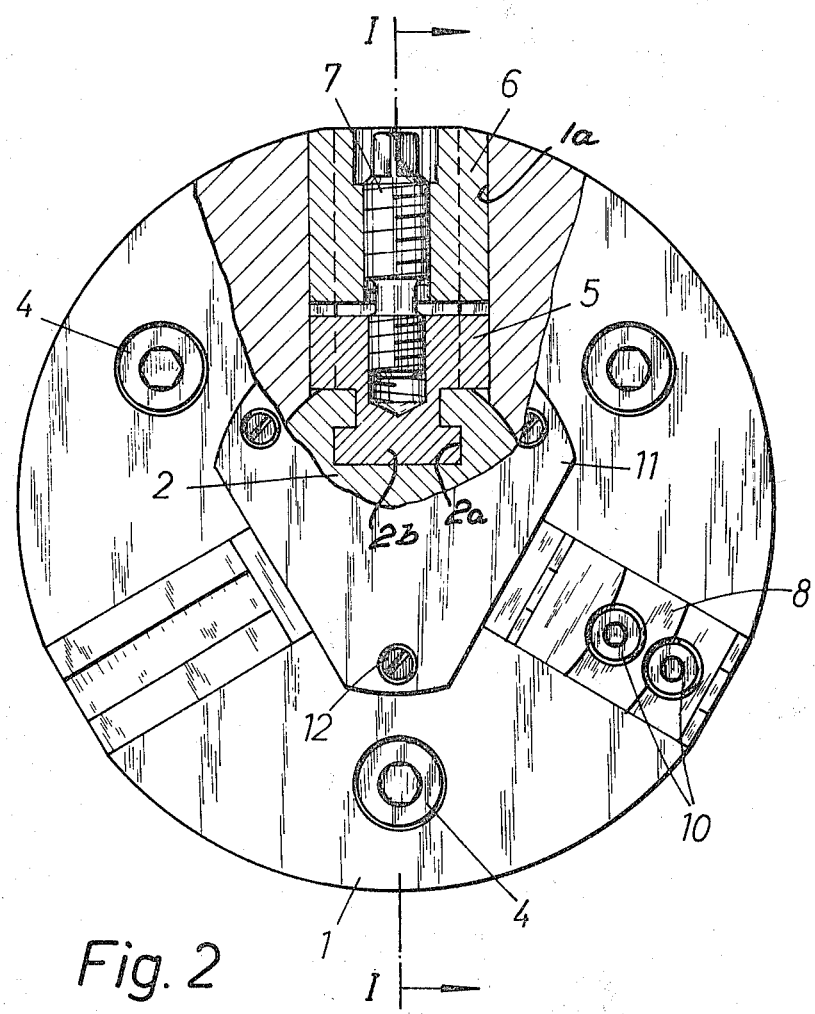
FIG. 2 shows a front view of the jaw chuck shown in FIG. 1, a part of the chuck being shown in section on the line II—II in FIG. 1.
Figure 4:
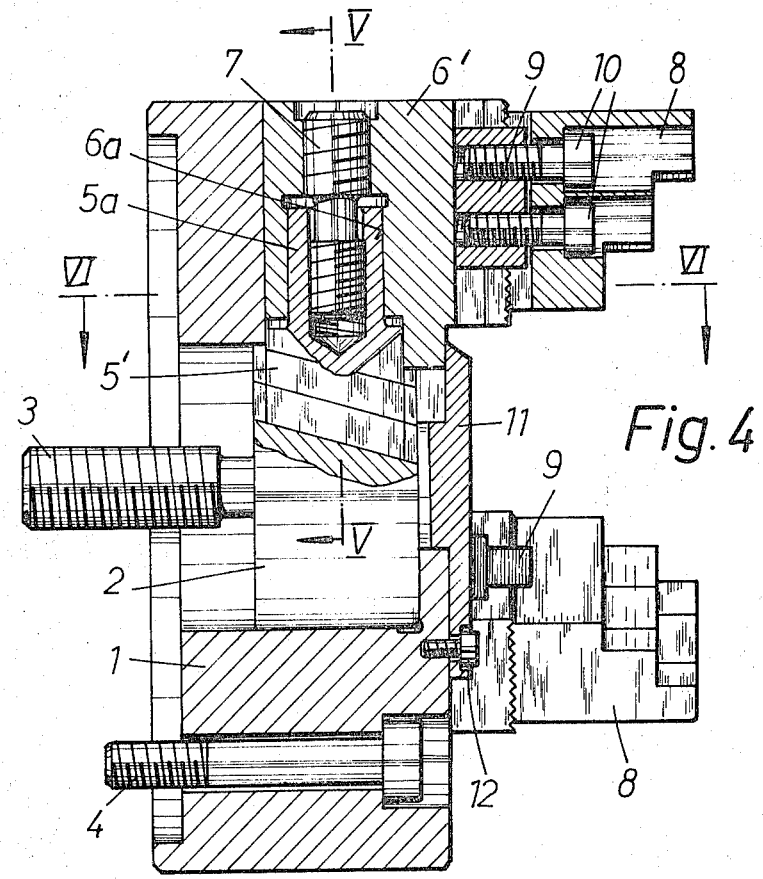
FIG. 4 shows a longitudinal section through a second embodiment of the invention.
Figure 6:
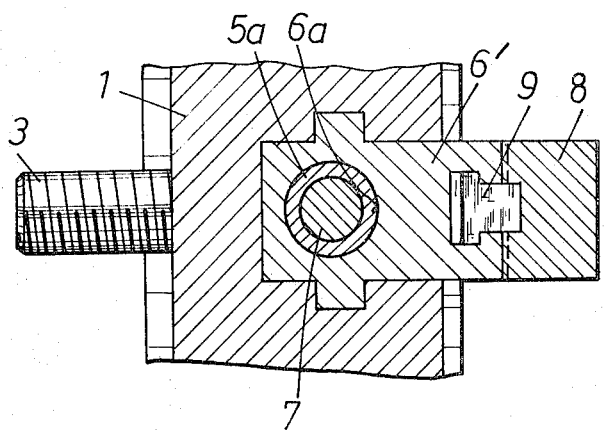
FIG. 6 shows a cross section through the chuck on the VI—VI in FIG. 4.
Figure 5:
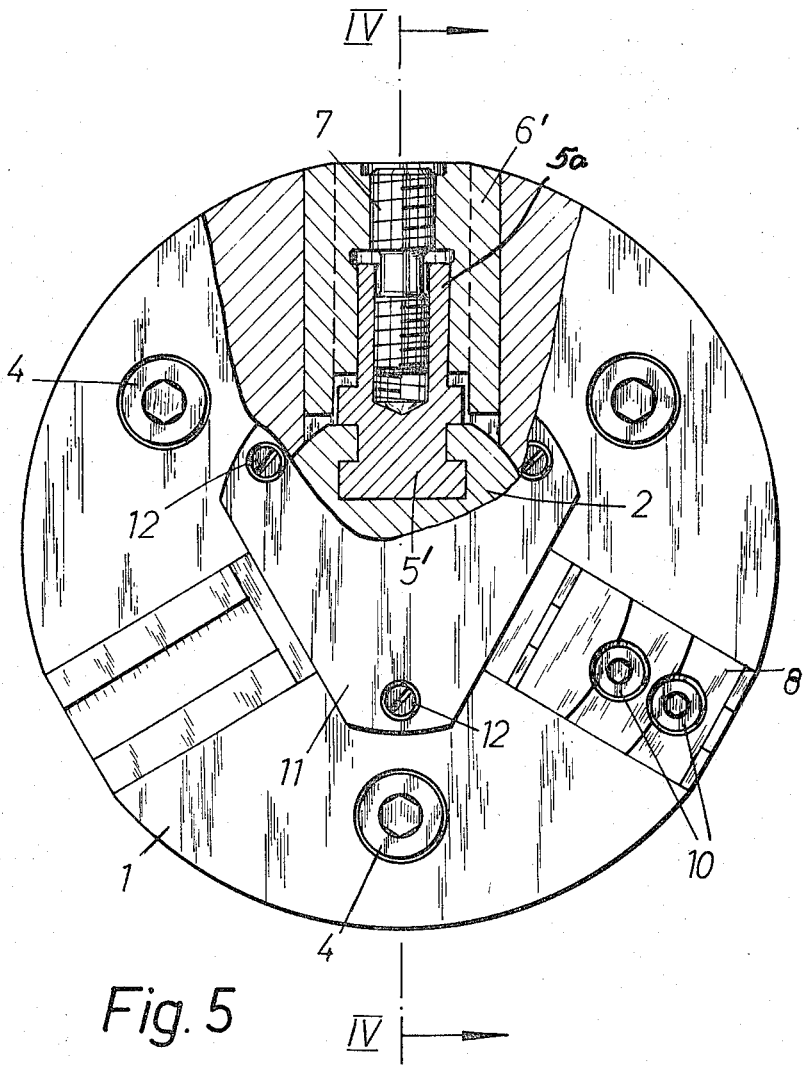
FIG. 5 shows a front view of the chuck shown in FIG. 4, a part of the chuck being shown in section on the line V V in FIG. 4.

In the embodiments shown in FIGS. 1 to 3, each driving jaw 5 with the associated jaw carrier 6 is guided in the associated radial guide 1a, the jaws which lie radially one behind another being clearly separated from each other. While this embodiment gives the driving jaw 5 and the jaw carrier 6 an adequate guide with chucks of large dimensions, this construction is not suitable for chucks of smaller dimensions. With jaw chucks of smaller dimensions, in order to insure an adequate guide, in the second embodiment according to FIGS. 4 to 6, each driving jaw 5' is provided with a guide pin 5a, which projects radially towards the outside of the driving jaw 5'. The jaw carrier 6' is fitted upon this guide pin 5a with a bore 6a, so that a relative movement is possible between the driving jaw 5 and the jaw carrier 6', which movement occurs in radial direction of the chuck or in longitudinal direction of the guide pin 5a. Due to the construction of the guide pin 5a, a good guidance of the driving jaw 5' and the jaw carrier 6' is obtained, without the necessity of providing an additional guide in the chuck body 1.

By means of the construction according to the invention of the driving jaws 5,5' and the jaw carriers 6,6' there results a simple possibility for the fine adjustment of the jaw 8, without requiring alterations to the chuck body 1. For this reason, it is also possible to exchange the integral jaw carriers of existing jaw chucks with a set of jaws of the invention, which consist of jaw carrier and driving jaw, so that even the existing jaw chucks can subsequently be equipped with the additional fine adjustment.

It is, of course, to be understood, that the present invention is, by no means, limited to the particular constructions shown in the drawings, but also comprises various modifications, the scope of the invention being defined by the claims attached hereto.

I claim:

1. A power-operable chuck which includes: a chuck body having a substantially central axial bore and a plurality of guiding passages radially arranged with regard to said bore, a plurality of chucks respectively movably supported in said guiding passages, each of said chucks comprising a radial driving jaw and a jaw carrier and a clamping jaw connected to the respective adjacent jaw carrier for clamping engagement with the workpiece to be chucked, a piston displaceable in said bore and provided with wedge groove means complementarily engaged by said radial driving jaws for actuating the latter in radial direction in step-free manner under pressure directly, said jaw carriers being located radially outwardly of said driving jaws with regard to said piston, and adjusting means differentially respectively interconnecting said driving jaws and said jaw carriers respectively located in one and the same radial passage and operable to effect an individual infinitely fine adjustment relative to each other.

2. A power-operable chuck which includes: a chuck body having a substantially central axial bore and a plurality of guiding passages radially arranged with regard to said bore, a plurality of chucks respectively movably supported in said guiding passages, each of said chucks comprising a driving jaw and a jaw carrier and a clamping jaw connected to the respective adjacent jaw carrier for clamping engagement with the workpiece to be chucked, a piston displaceable in said bore and provided with wedge groove means engaged by said driving jaws for actuating the latter in radial direction, said jaw carriers being located radially outwardly of said driving jaws with regard to said piston, and adjusting means respectively interconnecting said driving jaws and said jaw carriers respectively located in one and the same radial passage and operable to effect an infinitely fine adjustment relative to each other, rotatable adjustable spindle means forming said adjusting means and being provided with axially spaced thread sections respectively having different pitch and respectively engaging the driving jaws and jaw carriers pertaining thereto, said spindle means being operable from the outside of said chuck body.

3. A power operable chuck which includes: a chuck body having a substantially central axial bore and a plurality of guiding passages radially arranged with regard to said bore, a plurality of chucks respectively movably supported in said guiding passages, each of said chucks comprising a driving jaw and a jaw carrier and a clamping jaw connected to the respective adjacent jaw carrier for clamping engagement with the workpiece to be chucked, a piston displaceable in said bore and provided with wedge groove means engaged by said driving jaws for actuating the latter in radial direction, said jaw carriers being located radially outwardly of said driving jaws with regard to said piston, and adjusting means respectively interconnecting said driving jaws and said jaw carriers respectively located in one and the same radial passage and operable to effect an infinitely fine adjustment relative to each other, each two adjacent driving jaws and jaw carriers pertaining thereto forming two substantially axial members, one of said members being provided with a guiding extension and the other one of said members being provided with recess means slidably engaged by said guiding extension.